United States Patent
Stege

(10) Patent No.: US 8,804,998 B2
(45) Date of Patent: Aug. 12, 2014

(54) METHOD TO DETERMINE A SITE FOR A WIND TURBINE

(75) Inventor: Jason Stege, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 323 days.

(21) Appl. No.: 13/472,535

(22) Filed: May 16, 2012

(65) Prior Publication Data

US 2012/0300986 A1  Nov. 29, 2012

(30) Foreign Application Priority Data

May 25, 2011 (EP) .................................... 11167444

(51) Int. Cl.
*G06K 9/00* (2006.01)

(52) U.S. Cl.
USPC ...................................................... 382/100

(58) Field of Classification Search
CPC .... G06K 9/0063; G06T 7/0046; G06T 17/05; G06T 2207/10032; G06T 2207/30181; G06T 2207/30192; G01C 11/00; B64C 2201/127; F03D 11/00; F03D 11/0091; F05B 2220/302; F05B 2260/80; F05B 2260/84; F05B 2270/32; F05B 2270/321; F05B 2270/322; Y02E 10/70; Y02E 10/723
USPC .......... 382/100, 103, 104, 154; 348/143, 144; 702/3, 5
See application file for complete search history.

(56) References Cited

U.S. PATENT DOCUMENTS

| | | | |
|---|---|---|---|
| 2007/0073486 A1 | 3/2007 | Tillotson et al. | 702/3 |
| 2010/0312594 A1* | 12/2010 | Andersen et al. | 705/7 |
| 2011/0166787 A1* | 7/2011 | Tencer et al. | 702/3 |
| 2012/0050750 A1* | 3/2012 | Hays et al. | 356/519 |
| 2012/0120230 A1* | 5/2012 | Wilkerson et al. | 348/135 |

FOREIGN PATENT DOCUMENTS

| | | |
|---|---|---|
| EP | 2133712 A1 | 12/2009 |
| GB | 2398841 A | 9/2004 |
| WO | WO 2009027509 A1 | 3/2009 |

OTHER PUBLICATIONS

J.M.L.M. Palma et al: "Linear and nonlinear models in wind resource assessment and wind turbine micro-siting in complex terrain", Journal of Wind Engineering and Industrial aeodynamics, Amsterdam, NL, vol. 96, No. 12, Dec. 1, 2008, pp. 2308-2326, XP024097881; Magazine; 2008.

* cited by examiner

*Primary Examiner* — Andrew W Johns

(57) ABSTRACT

According to the method an unmanned aerial vehicle is guided along a predetermined flight path. The flight-path is chosen in a way that high resolution images of the surrounding of a potential wind turbine site are gathered by the unmanned aerial vehicle. The images are used to obtain an actual digital surface model of the surrounding of the potential wind turbine site. The potential wind turbine site is evaluated based on the actual digital surface model to determine, if the potential wind turbine site is an optimum wind turbine site.

11 Claims, 3 Drawing Sheets

METHOD TO DETERMINE A SITE FOR A WIND TURBINE

CROSS REFERENCE TO RELATED APPLICATIONS

This application claims priority of European Patent Office application No. 11167444/6 EP filed May 25, 2011. All of the applications are incorporated by reference herein in their entirety.

FIELD OF INVENTION

A method to determine an optimum site for a wind turbine is provided.

BACKGROUND OF INVENTION

It is known to use a so called "Digital Surface Model, DSM" to determine an optimum site for a wind turbine.

The "Digital Surface Model, DSM" comprises the so called "Digital Terrain Model, DTM" and/or the so called "digital elevation model, DEM".

The DSM comprises stored terrain elevation data for the surface of the earth. The data are used to create digital models of the earth-surface. The DSM is applied to land-use studies and is even used for flood modeling, drainage modeling or for geological purposes.

The DSM is based on satellite-data, for example. It even may be based on the data of LIDAR-systems ("Light Detection And Ranging", LIDAR).

SUMMARY OF INVENTION

There is always a large distance between the satellite and the earth or between the LIDAR-system and the earth. Thus the resolution of gathered 2D-images or 3D-images, being used for the DSM, is quite rough.

Additionally the images of the satellite may be older than needed, thus the model-data do not contain new key features like buildings, trees, and the like.

An improved method for the determination of an optimum wind turbine site is provided.

According to the method invented a so called "Unmanned Aerial Vehicle, UAV" is guided along a predetermined flight path. The flight-path is chosen in a way that high resolution images (like pictures or maps) of the surrounding of a potential wind turbine site are gathered by the UAV.

The images are used to obtain an actual "Digital Surface Model, DSM" of the surrounding of the potential wind turbine site.

The potential wind turbine site is evaluated based on the actual Digital Surface Model in view to the wind-parameters there and even in view to other ambient parameters there.

If the potential wind turbine site fulfills predetermined criteria the wind turbine is erected at this site afterwards.

The UAV may carry at least components of an optical camera-system or the whole optical camera-system. Or the UAV may carry at least components of a LIDAR-system or the whole LIDAR-system.

This components or systems addressed above are small, cheap and they are even quite lightweight. Thus they are quite applicable to be used on board of an UAV.

The images, gathered by the UAV, may be combined with GPS-data. The GPS-data are gathered while the UAV follows the predetermined flight path. Thus each image is matched with its dedicated GPS-position to allow and enable a creation of a precise DSM.

Additional sensors or measuring devices may be used to provide additional data for the DSM. They may be located on board of the UAV, too.

The data of gyroscopes or accelerometers may be gathered and converted to improve the quality of the resulting 2D-maps or to improve the quality of the resulting 3D-maps.

A so called "Computational Fluid Dynamics, CFD"-software is used to determine the optimum site for a wind turbine.

The gathered data of the UAV are uploaded via the Internet for further post-processing steps.

With the method it is possible to capture data needed quite quick and cheap. The data may be gathered at any time and without the need for expensive components like satellites.

Additionally an UAV is simple to operate and it is quite small in its dimensions. Thus there is no need for expensive ground-personal and there is no need for specific transportation.

Furthermore, the used data-models are quite actual compared with the available data gathered by satellites.

BRIEF DESCRIPTION OF THE DRAWINGS

The figures shown illustrate specific embodiments and are not meant to limit the scope.

FIG. 2 illustrates an embodiment of the, and

DETAILED DESCRIPTION OF INVENTION

Figure 1:
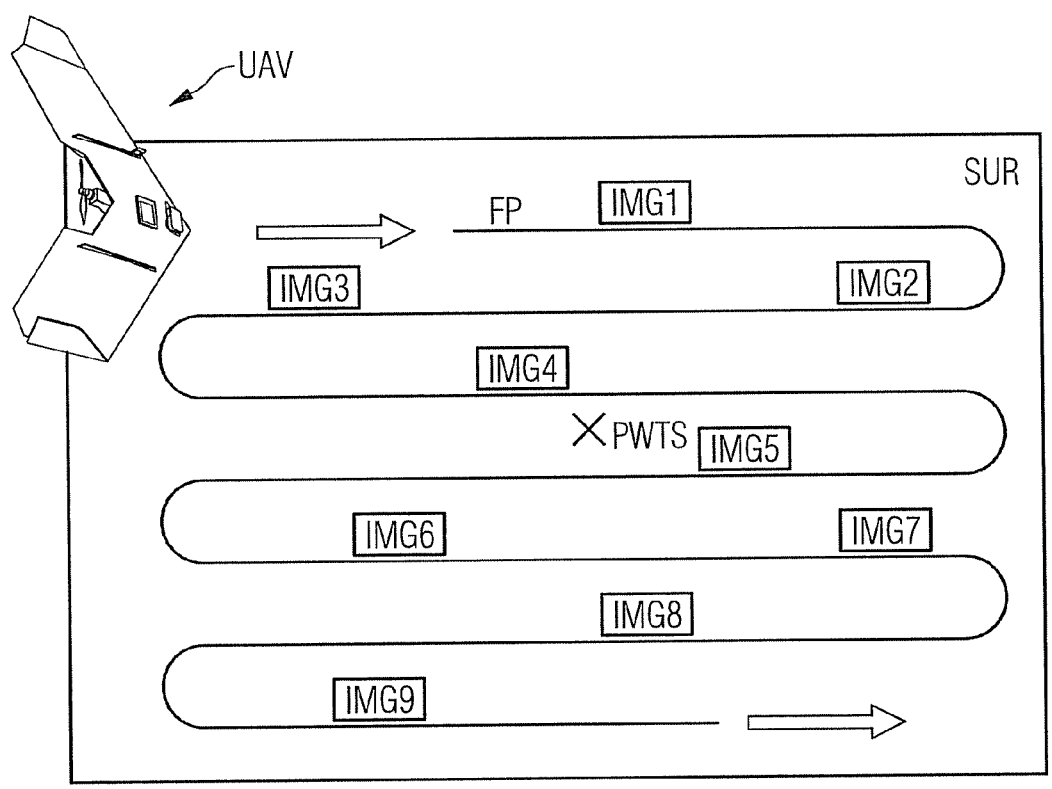
FIG. 1 illustrates a Unmanned Aerial Vehicle UAV along a flight path.
Figure 1:
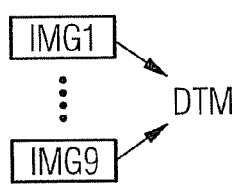

FIG. 1 illustrates a UAV along a flight path. According to the method the UAV is guided along a predetermined flight path FP.

The flight-path FP is chosen in a way that high resolution images IMG1-IMG9 of the surrounding SUR of a potential wind turbine site PWTS are gathered by the Unmanned Aerial Vehicle UAV.

The images IMG1-IMG9 are used to obtain an actual Digital Surface Model DSM of the surrounding SUR of the potential wind turbine site PWTS.

The potential wind turbine site PWTS is evaluated based on the actual Digital Surface Model DSM in view to the wind-parameters there.

The potential wind turbine site PWTS is evaluated based on the actual Digital Surface Model DSM in an additional view to other ambient parameters there, like the temperature-profile over the year, possible site-specific ice-loads, site-specific wind-loads, site-specific air moisture, site-specific salt-content in the air, etc.

If the potential wind turbine site PWTS fulfills predetermined criteria a wind turbine is erected there afterwards.

Figure 2:
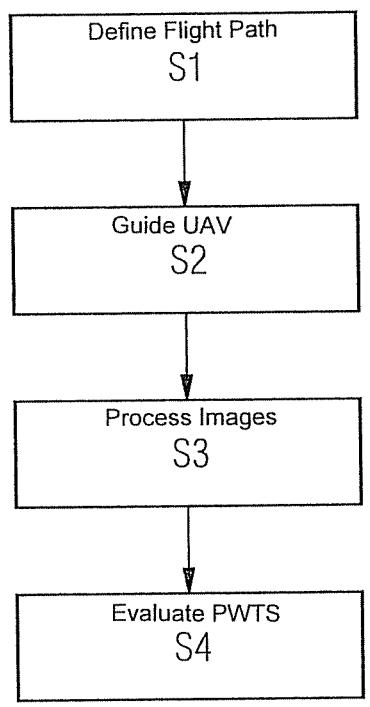

FIG. 2 illustrates the method as a flow-chart. Even reference is made to FIG. 1.

In a first step S1 a flight path FP is defined in view to the surrounding SUR of the potential wind turbine site PWTS.

The flight-path FP is chosen in a way that high resolution images IMG1-IMG9 of the surrounding SUR of the potential wind turbine site PWTS are gathered by the Unmanned Aerial Vehicle UAV.

In a second step S2 the Unmanned Aerial Vehicle UAV is guided along the flight path FP and a number of images IMG1-IMG9 is gathered by the Unmanned Aerial Vehicle UAV.

In a third step S3 the gathered images IMG1-IMG9 are processed to obtain an actual Digital Surface Model DSM of the surrounding SUR of the potential wind turbine site PWTS.

In a fourth step S4 the potential wind turbine site PWTS is evaluated based on the actual Digital Surface Model DSM. In one embodiment a "Computational Fluid Dynamics, CFD"-software may used to determine, when the potential wind turbine site PWTS seems to be an optimum site for a wind turbine.

If the potential wind turbine site fulfills predetermined criteria the wind turbine is erected at this site afterwards.

Figure 3:
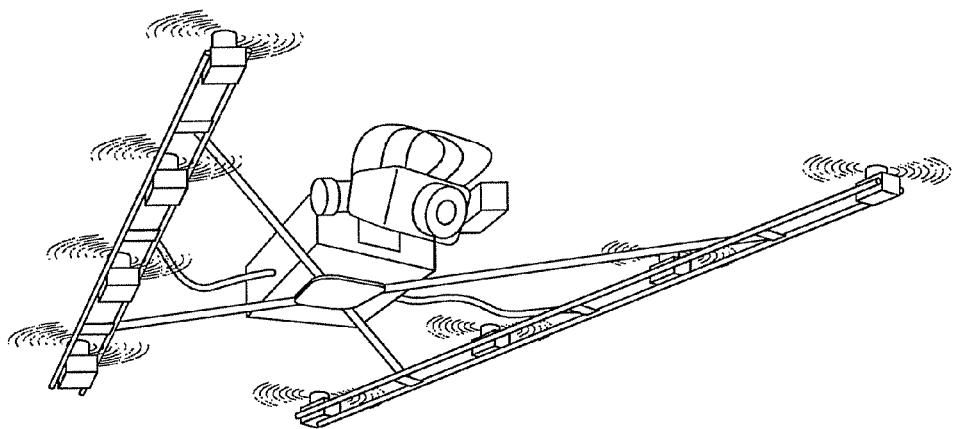
FIG. 3 illustrates a UAV to be used by the method.
Figure 3:
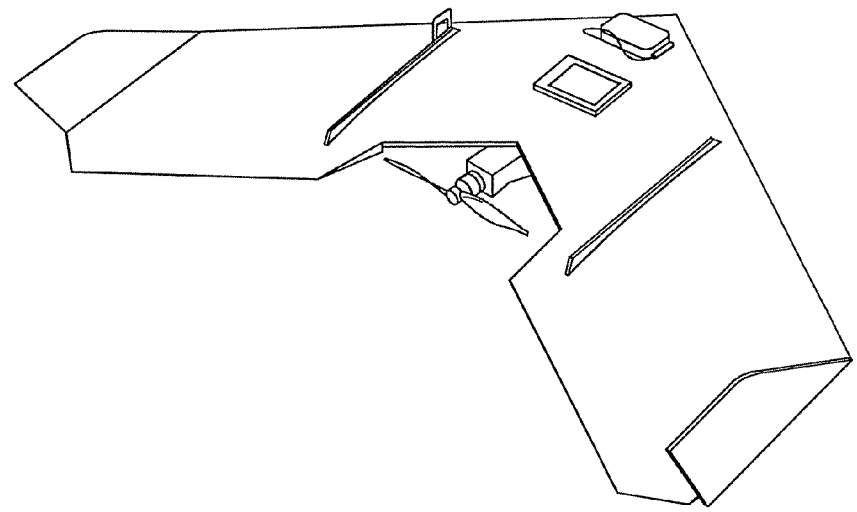

FIG. 3 illustrates two possible UAV to be used. One is named "Falcon-PARS", a kind of helicopter which is offered by the company "ISTS Americas Corporation" for example. The other one is a plane, offered by the company SENSEFLY, Switzerland, for example.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A method to determine a site for a wind turbine, comprising
   guiding an unmanned aerial vehicle along a predetermined flight path, which is chosen in a way that high resolution images of the surrounding of a potential wind turbine site are gathered by the unmanned aerial vehicle,
   obtaining, at least by the high resolution images, an actual digital surface model of the surrounding of the potential wind turbine site wherein the images are used to obtain an actual digital surface model of the potential wind turbine site, and
   evaluating the potential wind turbine site based on the actual digital surface model to determine when the potential wind turbine site is an optimum wind turbine site.

2. The method according claim 1,
   wherein the evaluating includes wind-parameters at the potential wind turbine site.

3. The method according claim 1,
   wherein the actual digital surface model of the surrounding of the potential wind turbine site is compared with predetermined criteria to determine whether or not or not a wind turbine is erected at this site.

4. The method according to claim 1,
   wherein the unmanned aerial vehicle carries at least components of an optical camera-system or the whole optical camera-system, being used to gather the high resolution images.

5. The method according to claim 1,
   wherein the unmanned aerial vehicle carries at least components of a LIDAR-system or the whole LIDAR-system, being used to gather the high resolution images.

6. The method according to claim 1,
   wherein the images are combined with GPS-data, which are gathered by the unmanned aerial vehicle while the unmanned aerial vehicle follows the predetermined flight path.

7. The method according to claim 6,
   wherein the GPS-data includes a GPS position of each image, and
   where each image is matched with its respective GPS-position to achieve a precise digital surface model.

8. The method according to claim 1,
   wherein additional sensors or measuring devices are used with the unmanned aerial vehicle to provide additional data for the digital surface model.

9. The method according to claim 8,
   where a gyroscope or an accelerometer are used to gather additional data for the digital surface model.

10. The method according to claim 1,
    where a Computational Fluid Dynamics-software is used to determine the optimum site for a wind turbine.

11. The method according to claim 1,
    where the high resolutions images, gathered by the unmanned aerial vehicle, are uploaded via the Internet to a computer for further processing steps.

* * * * *